United States Patent [19]
Annis et al.

[11] 3,730,315
[45] May 1, 1973

[54] HYDRODYNAMIC DEVICE WITH SLIPPING MECHANICAL CLUTCH

[75] Inventors: Robert E. Annis, Howell; Forrest R. Cheek, Detroit, both of Mich.

[73] Assignee: General Motors Corporation, Detroit, Mich.

[22] Filed: July 30, 1971

[21] Appl. No.: 167,655

[52] U.S. Cl. ......................192/3.3, 192/86, 60/54, 192/3.5 B, 74/733
[51] Int. Cl. .............................................F16d 47/06
[58] Field of Search......................192/3.29, 3.3, 3.33

[56] References Cited

UNITED STATES PATENTS

| | | |
|---|---|---|
| 3,516,524 | 6/1970 | Kelty et al. .............................192/3.3 |
| 2,699,074 | 1/1955 | Livezey et al. .........................192/3.3 |
| 2,860,747 | 11/1958 | Kelley ....................................192/3.3 |
| 3,384,209 | 5/1968 | Murphy..............................192/3.33 |

*Primary Examiner*—Benjamin W. Wyche
*Attorney*—J. L. Carpenter et al.

[57] ABSTRACT

A hydrodynamic device having an impeller, a turbine and a clutch for providing a slipping mechanical drive between the turbine and impeller in addition to the normal hydraulic drive therebetween wherein the clutch is engaged with fluid pressure derived from the pressure within the hydrodynamic device and is controlled by a valve operated by thrust on the turbine to maintain a constant speed differential between the turbine and impeller regardless of input torque.

4 Claims, 3 Drawing Figures

Patented May 1, 1973
3,730,315
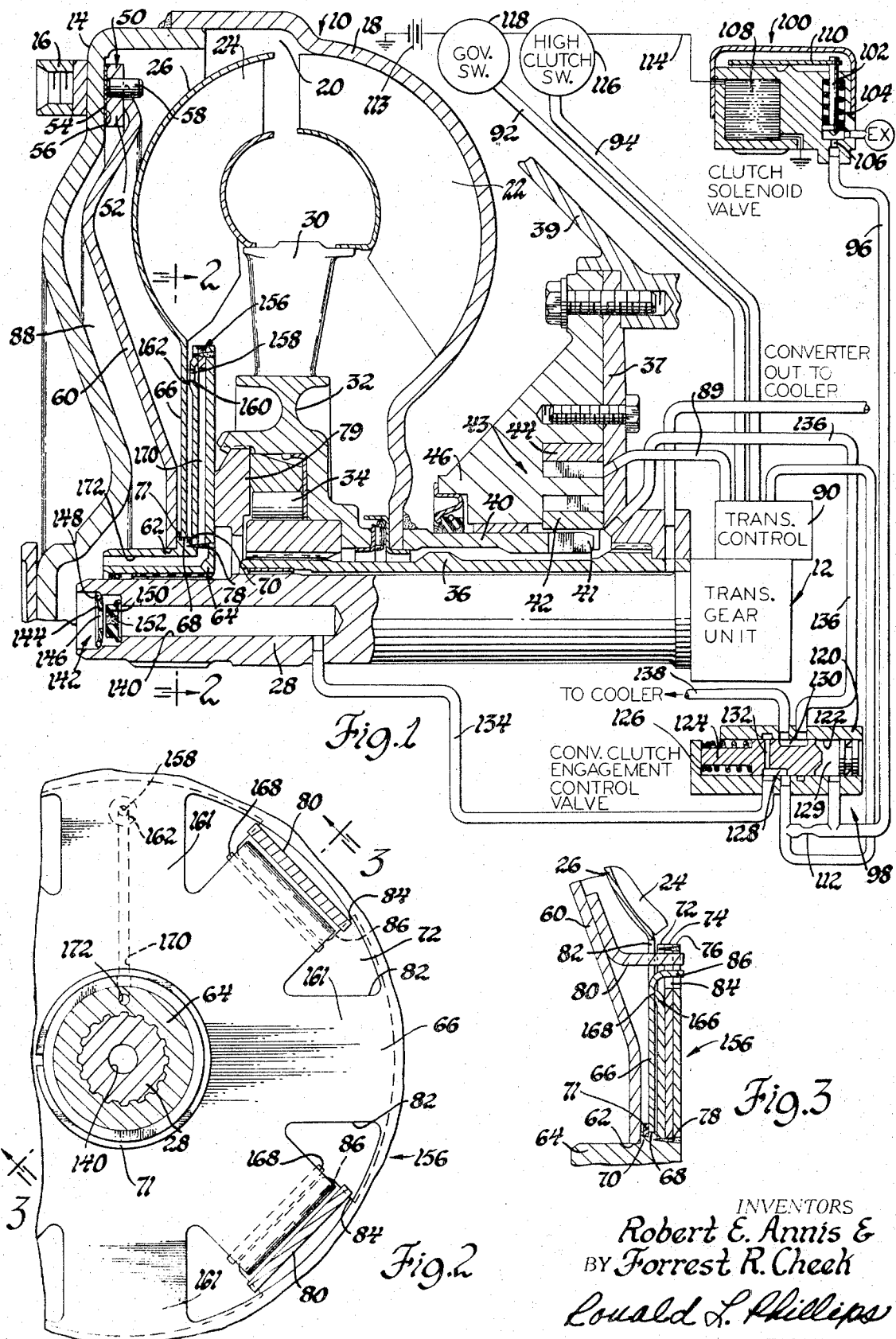

HYDRODYNAMIC DEVICE WITH SLIPPING MECHANICAL CLUTCH

This invention relates to hydrodynamic devices and more particularly to hydrodynamic devices having a slipping mechanical clutch.

A slipping mechanical clutch in a hydrodynamic device offers several advantages including increase in fuel economy resulting from reduced slip speeds between the device's turbine and impeller and reduction in the heat generated in the device caused by the slipping action between the impeller and turbine. Such slipping type clutches are to be distinguished from the more conventional converter lockup clutches which prevent any slip speed by providing for full torque transmittal. Among the advantages of a slipping clutch over a converter lockup clutch is that the hydraulic drive provided by the impeller and turbine remains available to isolate engine vibrations from the downstream portion of the drive train. For a slipping clutch to maintain its advantage over a lockup clutch relative to isolation of engine vibrations, the clutch should be controlled such that some slip is maintained to avoid lockup regardless of the input torque.

According to the present invention there is provided in a hydrodynamic device a fluid pressure operated converter slip clutch that operates to provide a slipping mechanical drive between the hydrodynamic device's turbine and impeller in parallel with a reduced hydraulic drive therebetween with this slipping mechanical drive having a limited speed differential between the turbine and impeller over a large range of torque transmittal. The converter slip clutch has an apply chamber and a release chamber with the apply chamber being in fluid communication with the charge pressure region of the hydrodynamic device. A clutch engagement control valve operates in a clutch release position to direct fluid to the release chamber which then directs the fluid to the apply chamber and thus to the charge pressure region of the hydrodynamic device to effect release of the slip clutch and charging of the hydrodynamic device for its normal operation. For slipping clutch engagement, the converter clutch engagement control valve is moved to a clutch engage position wherein it directs fluid in the reverse direction first to the charge pressure region of the hydrodynamic device. A converter slip clutch control valve then operates to control fluid flow from the apply chamber to the release chamber to thereby vary the pressure differential between the apply chamber and the release chamber to effect a pressure force on the clutch to provide slipping clutch action to effect mechanical drive which together with the hydraulic drive that is maintained provides a so-called split torque drive. The converter slip clutch control valve is operated by the thrust on the hydrodynamic device's turbine to control the flow to the release chamber. This thrust decreases with decreasing converter slip and operates on the slip clutch control valve to provide an effective clutch engaging pressure that decreases with decreasing thrust so that the clutch is provided with a torque capacity that maintains some speed differential or slip between the turbine and impeller regardless of the input torque to the converter.

An object of the present invention is to provide in a hydrodynamic device a new and improved torque-split converter clutch control.

Another object is to provide in a hydrodynamic device a mechanical clutch that provides a slipping mechanical drive in addition to the normal hydraulic drive between the device's impeller and turbine with the slipping mechanical drive having a slip speed that is controlled by the thrust on the turbine.

Another object is to provide in a hydrodynamic device a slipping mechanical drive having a torque capacity that is controlled by turbine thrust to maintain some converter slip regardless of the input torque to the device.

Another object is to provide in a hydrodynamic device a torque-split converter clutch that controls the hydrodynamic device's slip by utilizing the thrust of the turbine to operate a valve that controls the pressure differential between a clutch apply chamber and a clutch release chamber by controlling the pressure in the release chamber to effect a slipping mechanical drive that maintains a constant converter slip over a large range of torque transmittal.

These and other objects of the present invention will be more apparent from the following description and drawing in which:

FIG. 1 is a longitudinal view with parts in section and parts shown diagrammatically of a transmission incorporating a hydrodynamic device according to the present invention.

FIG. 2 is a view taken on the line 2—2 in FIG. 1.

FIG. 3 is a view taken on the line 3—3 in FIG. 2.

Referring to FIG. 1, the invention is illustrated for use in a vehicular automatic transmission generally comprising a hydrodynamic device 10 and a gear unit 12 which is operable to provide a plurality of forward drives and a reverse drive and may be of the type shown in U.S. Pat. No. 3,321,056 to Winchell et al. The hydrodynamic device 10 is of the torque converter type and comprises a front cover 14 which is adapted to be connected by lugs 16 to the vehicle's engine and is welded to a rear cover 18 to provide a rotary converter housing that encloses an annular chamber 20. A series of vanes 22 secured to the rear cover 18 provide an impeller that is thus connected to rotate with the engine. A series of vanes 24 secured to an annular shell 26 provide a turbine which is connected by structure that is described in more detail later to a turbine or converter output shaft 28 which serves as the input to the gear unit 12. A series of vanes 30 which are integral with a hub 32 and are disposed between the inner ends of the turbine and impeller vanes provide a stator. Stator 30 is permitted free rotation in the same direction as the impeller which direction is the forward direction by a one-way brake 34 of the roller type. One-way brake 34 is disposed between the stator hub 32 and a sleeve 36 that is grounded at its rear end to a front bulkhead 37, the bulkhead 37 being secured at its outer periphery to the transmission's stationary housing 39 and being located between the torque converter 10 and the gear unit 12. The torque converter structure thus far described is conventional and on supply of fluid to the chamber 20 at a suitable charge pressure operates to provide torque multiplication between the impeller and turbine to drive the converter output shaft 28 and thus the gear unit 12 with such torque multiplication decreasing as the turbine approaches impeller speed at which time the torque converter then normally acts as a fluid coupling to continue the drive of the converter output shaft 28, the one-way brake 34 permitting the stator 30 to free-wheel in the forward direction during the coupling operation.

The rear cover 18 is welded at its rear face to a sleeve 40 that is connected at its rear end by a tongue and slot connection 41 to drive an external toothed gear 42 of a conventional internal-external gear type pump 43. The pump's internal toothed gear 44 together with the external toothed gear 42 are mounted in a pump housing 46 which is bolted to the front side of the bulkhead 37.

According to the present invention, there is provided in the torque converter 10 a fluid pressure operated torque-split converter clutch 50 that is operable to provide a slipping mechanical drive between the rotary converter front cover 14 and the converter output shaft 28. This slipping mechanical drive is thus in parallel with the normal hydraulic drive to provide a slip-torque drive to gear unit 12. The clutch 50 which may also be referred to as a slip clutch comprises an annular plate 52 having a friction facing 54 engageable with an annular radially extending face 56 formed on the rear side of the front cover 14 within the rotary converter housing. The friction plate 52 is connected by dowel pins 58 to a disc 60 that has a central opening 62 through which a hub 64 for both the clutch and turbine extends. Hub 64 is splined at its interior to the left end of the converter output shaft 28 but is not directly connected to either disc 60 or turbine 24 and instead pilots both these members for axial movement. The turbine shell 26 has a flat portion 66 extending radially inwards toward the hub 64. Turbine shell portion 66 has a central opening 68 received on an enlarged diameter portion 70 of hub 64 and is located so that there is clearance between the turbine shell portion 66 and plate 72 in the free state, there being a snap ring 71 mounted on portion 70 to limit movement of shell portion 66 at its inner radius toward clutch disc 60. As shown in FIGS. 1 and 3, an axially rigid sandwich construction of three drive plates 72, 74 and 76 are welded at their interior to each other and also to a reduced diameter portion 78 on hub 64. Plates 72, 74 and 76 are also welded to each other at their outer radius and are prevented from moving rightward by plate 76 bearing against a thrust ring 79 fixed to stator hub 32. Referring to FIGS. 2 and 3, a plurality of generally L-shaped clutch drive lugs 80 each have one leg welded to the rear side of clutch disc 60 and the other leg extending axially through an aperture 82 in turbine shell portion 66 and into an aperture 84 that extends axially through the plates 72, 74 and 76. The turbine shell 26 is also provided with drive lugs 86. Lugs 86 are formed from making the aperture 82 in shell section 66 and also extend axially into the aperture 84 in the plates 72, 74 and 76 radially inside of the drive lugs 80 so that there is thus provided mechanical drive from both the turbine 24 and the clutch disc 60 to converter output shaft 28. Furthermore, with this structural arrangement the disc 60 forms with the front converter cover 14 a chamber 88 separate from the converter chamber 20. With this arrangement, when the pressure in chamber 88 exceeds that in chamber 20 the disc 60 is urged rightward to disengage clutch 50. Alternatively, when the pressure in chamber 20 exceeds that in chamber 88 the disc 60 is urged leftward to engage clutch 50.

Describing now the transmission control system including the control for clutch 50, the engine driven pump 43 supplies fluid via a passage 89 to a conventional transmission control 90 which operates gear unit 12 and may be of the type disclosed in the aforementioned Winchell et al. patent. For the control of clutch 50 the transmission control 90 distributes fluid to a governor switch passage 92, a high clutch switch passage 94 and a converter-clutch passage 96. The governor switch passage 92 and the high clutch switch passage 94 may be continuations of or otherwise connected to the governor passage and the high or direct drive passage, respectively, in the aforementioned Winchell et al. patent. The converter-clutch passage 96 is connected directly to a converter-clutch engagement control valve 98 and a clutch solenoid valve 100. The clutch solenoid valve 100 has a poppet valve element 102 surrounded by a spring 104 that biases the poppet valve element 102 into a closing relation with a port 106 in passage 96. The solenoid valve 100 further has an electrical magnet 108 which when energized attracts a lever 110 connected to poppet valve element 102 to move the poppet valve element away from port 106 to the open position shown so that fluid pressure in passage 96 can be exhausted downstream of a flow restriction 112 that is in turn located downstream of the pressure feed to the converter-clutch control valve 98, the flow restriction 112 thus preventing a decrease of pressure in the transmission control 90 when the clutch solenoid valve 100 is opened.

The electromagnet 108 is connected to the vehicle's electrical power source 113 through a wire 114, a high clutch switch 116 in fluid communication with passage 94 and a governor switch 118 in fluid communication with passage 92. The switches 116 and 118 are conventional pressure operated electrical switches having contacts that are normally spring biased open and are closed by fluid pressure. With this arrangement, the switches 116 and 118 must both be closed before the electromagnet 108 is energized to open clutch solenoid valve 100. The high clutch switch 116 is closed whenever the high clutch in the transmission is engaged to establish the high device ratio. The governor switch 118 is calibrated so as to be closed when the governor pressure which increases with increasing vehicle speed reaches a certain value indicating that the vehicle speed has reached a predetermined value suitable for the split torque drive. Therefore, the transmission must be operating in high drive and the vehicle speed must be above a predetermined value before the electromagnet 108 is energized to open the normally closed clutch solenoid valve 100.

The converter-clutch engagement control valve 98 which is fed from the transmission control 90 by the passage 96 upstream of the flow restriction 112 comprises a valve body 120 having a bore 122. A spool valve element 124 is slideably disposed in the valve bore 122 and a spring 126 compressed between the spool valve element and the left end of the valve bore biases the spool valve element rightward. The spool valve element 124 has a pair of recesses 128 and 130 located at its outer periphery and also a flow restrictive passage 132 providing fluid communication between the recess 128 and the opposite side of the outer diameter of the spool valve element 124. Fluid pressure from the transmission control 90 is continuously supplied via the converteroclutch passage 96 to the recess 128 and is also supplied via flow restriction 112 to a chamber 129 at the right-hand end of the spool valve element 124. When pressure is permitted to build in chamber 129 which occurs when clutch solenoid valve 100 is closed, the spool valve element 124 is moved leftward against the spring bias to the position shown.

In the position shown, the spool valve element 124 provides communication between passage 96 and a converter-clutch disengagement passage 134 via recess 128 and also between a converter-clutch engagement passage 136 and a cooler passage 138 via recess 130. The converter-clutch disengagement passage 134 is connected via a bore 140 and a check valve 142 in converter output shaft 28 to the release chamber 88. The check valve 142 comprises a valve seat member 144 which is press fitted in the enlarged left end of bore 140 and has a central portion 146 and a plurality of circumferentially spaced ports 148. Valve 142 further includes a movable valve element 150 which is located between valve seat member 144 and the step of the enlarged portion of bore 140 and has a central port 152 smaller than port 146. When fluid flow is from passage 134 to chamber 88 the pressure acting in bore 140 urges the valve member 150 leftward so that flow through the check valve is then without substantial restriction by being provided through port 152 in valve member 150 and also through the ports 148 in the valve seat member 144. Alternatively, when fluid flow is in the opposite direction, the pressure acting in the left side of valve element 150 urges this member rightward to the position shown in which all of the flow is required to flow through port 152 which by restricting such flow provides for back pressuring release chamber 88 as described in more detail later. When flow is from passage 134 via the check valve 142 to release chamber 88, the clutch disc 60 is urged rightward so that the fluid flow then continues past the clutch plate 52 into the converter chamber 20 to feed the converter's toric fluid circuit between the outer edges of the impeller 22 and turbine 24. Fluid returns from the converter between sleeves 36 and 40 to passage 136 which is then connected to the transmission's cooler via recess 130 of the converter-clutch control valve 98 and the cooler passage 138.

When the clutch solenoid valve 100 is opened, thereby relieving the pressure in chamber 129 of the converter clutch control valve 98, the spool valve element 124 is moved to the right by pring 126 to connect passage 96 via the recess 128 to the converter-clutch engagement passage 136 and also to connect passage 96 via this recess and flow restrictive passage 132 to the cooler passage 138. When the spool valve element 124 moves to the right the converter-clutch disengagement passage 134 is exhausted through the left end of the valve bore 122. Therefore, with the clutch solenoid valve 100 opened, fluid pressure enters chamber 20 of the converter 10 via passage 136 and is connected to be exhausted only through flow restriction 152 of the check valve 142 with fluid flow from chamber 20 to release chamber 88 and thence to the disengagement passage 134 being controlled by a clutch slip control valve 156 which will now be described.

The clutch slip control valve 156 operates when fluid pressure is being supplied to chamber 20 of the converter 10 via the engagement passage 136 to provide a variable flow rate connection between chamber 20 and the release chamber 88 to vary the pressure differential between these chambers and thus the effective leftward clutch engagement pressure which is acting to apply clutch 50. To aid in understanding the operation of valve 156, it must be recognized that in a hydrodynamic device of the type disclosed there is a trust on the turbine 24 toward the impeller 22 which direction is rightward as viewed in FIG. 1. Furthermore this thrust is a function of the converter slip or the speed differential between the turbine and impeller wherein the thrust decreases with decreasing converter slip and reaches zero when the turbine speed is equal to impeller speed.

Describing now the details of the clutch slip control valve 156, there is provided in the drive plate 72 an axially extending port 158 which extends through the center of a circular boss 160 which projects axially in the direction of the flat turbine shell section 66 and is opposite one of flat shell regions 161 intermediate the shell apertures 82. Boss 160 has a valve seat provided by a flat circular face 162 surrounding port 158 that is engageable with the opposed flat shell region 161 to close port 158 from chamber 20. The port 158 is larger than the flow restriction 152 in the check valve 142 so that it is possible to make the pressure in chamber 88 nearly the same as the pressure in chamber 20 so that the pressure difference between them is small. As shown in FIG. 3, in forming the aperture 84 a portion 166 of plate 72 is bent axially toward the flat shell portion 66 and has a radially extending flat face 168 that engages the flat shell portion 66 to provide both a stop and a fulcrum for the turbine 24. When there is no thrust on the turbine in the direction of the impeller which occurs when there is little or no converter slip there is provided a predetermined clearance between the flat face 162 and the opposed flat shell region 161 by the stop-fulcrum portion 166 holding the axial position of the flat shell portion 66 as shown in FIG. 1 so that fluid is free to flow from the chamber 20 through this clearance and then through the port 158 to a passage 170. Passage 170 extends radially downward through the middle plate member 74 and is then connected by a passage 172 in hub 64 to the release chamber 88 and also via the check valve 142 to the passage 134. This is the maximum open position for the converter clutch slip control valve 156. Then as converter slip increases and as a result the rightward thrust on the turbine increases, the turbine shell 26 in the regions 161 of section 66 is displaced or flexes axially relative to the stop-fulcrum portion 168 as viewed in FIG. 1 to generate in the turbine shell a spring load to resist the thrust that is urging reduction in the opening of chamber 20 to port 158 past the turbine shell region 161 opposite this port. Thus, the converter clutch slip control valve 156 controls the rate of flow from chamber 20 to the release chamber 88 and since when the flow is in this direction the flow restriction 152 is operative to back pressure the release chamber 88, the valve 156 by controlling the opening to the port 158 controls the pressure in release chamber 88 relative to the pressure chamber 20 which is converter charge pressure. Thus, the pressure in release chamber 88 is regulated by the converter clutch slip control valve 156 according to the spring force provided by the turbine shell to provide the clutch with an effective engaging pressure that limits the converter slip or speed differential between the turbine and impeller over a large range of torque transmittal by the clutch.

OPERATION

Describing now a typical operation, when the transmission is not in high gear or the transmission is in high gear but the vehicle speed is below that required to close the governor switch 118, the converter-clutch engagement control valve 98 is in its normal converter clutch disengage position wherein fluid from the transmission control 90 is directed via the passage 134, check valve 142, chamber 88 and past the clutch plate 52 to charge chamber 20 of the converter with the fluid being returned via the then connected passages 136 and 138 to the cooler. Since the pressure in chamber 20 is either at or less than the pressure in the release chamber 88 the converter torque-split clutch 50 is disengaged and the converter 10 thus provides normal converter operation.

Alternatively, when the transmission is in high gear and the vehicle speed is high enough to close the governor switch 118, the converter-clutch engagement control valve 98 is then conditioned in its converter clutch engage position to deliver fluid to the converter via the passage 136 with the fluid in chamber 20 being used to both charge the converter and also to urge the clutch 50 to engagement. The thrust on the turbine 24 in the direction of the impeller 22 resulting from converter slip urges flexure of the flat shell portion 66 in the spoke-like regions 161 relative to the stop-fulcrum portion 166 to urge closure of chamber 20 to the port 158. The spring force of valve 156 provided by the turbine shell with its particular shape and mounting is calibrated so that at some predetermined converter slip, the thrust flexes the turbine shell regions 161 whereby the opening to port 158 is narrowed by the turbine shell region 161 opposite this port. Thus, the flow to chamber 88 and therefore the pressure therein tends to decrease with increasing thrust as converter slip tends to increase past the predetermined value. The pressure in chamber 20 is converter charge pressure and with the lower regulated back pressure in chamber 88 provided by valve 156 there is effected a pressure differential between chamber 20 and release chamber 88 on disc 60 to engage the clutch 50 to provide a slipping mechanical drive in parallel with the converter's fluid drive that maintains the speed differential between the turbine and impeller constant regardless of input torque to the converter. For example, a normal converter slip value is where the turbine rotates at 95 percent of the speed of the impeller but with the converter slip clutch and control according to the present invention there can be effected a constant 1 percent slip for greater economy and efficiency over a large range of torque transmittal. On the other hand, the operation of the converter clutch slip control valve 156 assures that the clutch 50 will only lock up when the torque transmitted is small and the minimum torque capacity of the clutch is determined by the minimum pressure differential between chamber 20 and release chamber 88 which exists when port 158 in valve 156 is full open. Since the state of the slipping clutch is such that the average torque being transmitted is equal to the average torque capacity of the clutch while slipping, small high frequency input speed variations do not produce output speed variations but rather produce variations in slip speed. The relatively small variations in slip speed caused by a vibrating input from an engine are not great enough to cause the controlled slip clutch to produce a corresponding change in clutch torque capacity; therefore there are no engine output torque pulses generated such as are generated when a lockup clutch, which has a torque capacity greater than the average torque being transmitted, is connected between an engine and a transmission gear unit.

The above described embodiment is illustrative of the invention which may be modified within the scope of the appended claims.

We claim:

1. A hydrodynamic device comprising an impeller and a turbine that sustains a thrust that decreases with decreasing speed differential between said impeller and said turbine, fluid pressure operated clutch means for clutching said turbine to said impeller to provide a slipping mechanical drive between said turbine and said impeller, and valve means operated by the thrust on said turbine for providing said clutch means with an effective engaging fluid pressure to maintain a constant slip between said impeller and said turbine.

2. A hydrodynamic device comprising an impeller and a turbine that sustains a thrust that decreases with decreasing speed differential between said impeller and said turbine, fluid pressure operated clutch means having a driving clutch member connected to rotate with said impeller and a driven clutch member connected to rotate with said turbine and selectively engageable with said driving clutch member to provide a slipping mechanical drive between said turbine and said impeller, clutch control valve means for directing fluid to engage said clutch means, and said clutch control valve means including clutch slip control valve means operated by the thrust on said turbine for providing an effective engaging pressure acting on said clutch means that is a function of the speed differential between said turbine and said impeller to maintain a constant slip between said turbine and said impeller as input torque to said hydrodynamic device varies.

3. A hydrodynamic device comprising an impeller and a turbine that sustains a thrust that decreases with decreasing speed differential between said impeller and said turbine, fluid pressure operated clutch means having a driving clutch member connected to rotate with said impeller and a driven clutch member connected to rotate with said turbine and selectively engageable with said driving clutch member to provide a slipping mechanical drive between said turbine and said impeller, said fluid pressure operated clutch means further including a clutch apply pressure responsive area and a clutch release pressure responsive area, clutch control valve means for directing fluid to said hydrodynamic device and said clutch apply pressure responsive area and then to said clutch release pressure responsive area to engage said clutch means and in the opposite flow direction to release said clutch means, and said clutch control valve means including clutch slip control valve means operated by the thrust on said turbine for controlling the pressure acting on said clutch release pressure responsive area to provide a pressure differential between said areas to effect an effective engaging pressure acting on said clutch apply pressure responsive area to maintain a constant slip between said turbine and said impeller regardless of the input torque to said hydrodynamic device.

4. A hydrodynamic device comprising a rotary converter housing defining a chamber, an impeller within said chamber connected to rotate with said housing, a turbine within said chamber driven by fluid from said impeller and sustaining a thrust that decreases with decreasing speed differential between said turbine and said impeller, clutch means within said rotary housing comprising a driving member connected to rotate with said housing and a driven member frictionally engageable with said driving member, said driven member defining within said converter housing a clutch release chamber separate from said hydrodynamic device chamber, said driven clutch member being engageable with said driving member on establishment of pressure in said hydrodynamic device chamber greater than pressure in said release chamber, converter clutch engagement control valve means operable in a clutch release condition to direct fluid to said release chamber to disengage said clutch means and open said release chamber between said driving member and said driven member to said hydrodynamic device chamber to charge said hydrodynamic device to provide normal hydrodynamic device operation and operable in a clutch engagement condition to direct fluid first to said hydrodynamic device chamber to provide for hydrodynamic device operation, check valve means for permitting free flow to said release chamber when said converter clutch engagement control valve means is in said clutch release condition and for resisting fluid flow from said release chamber when said converter clutch engagement control valve means is in said clutch engagement condition and converter clutch slip control valve means comprising movable valve means operated by the thrust on said turbine to provide a variable opening between said hydrodynamic device chamber and said release chamber whose size decreases on valve movement from an open condition to a closed condition with increasing thrust, spring means for resisting valve movement from said open condition to said closed condition.

\* \* \* \* \*